(12) United States Patent
Mori et al.

(10) Patent No.: US 6,382,281 B1
(45) Date of Patent: May 7, 2002

(54) PNEUMATIC TIRE AND METALLIC MOLD FOR TIRE BUILDING

(75) Inventors: Shinichi Mori; Masaharu Sekoguchi, both of Hiratsuka (JP)

(73) Assignee: The Yokohama Rubber Co., Ltd, Tokyo (JP)

( * ) Notice: Subject to any disclaimer, the term of this patent is extended or adjusted under 35 U.S.C. 154(b) by 0 days.

(21) Appl. No.: 09/517,281

(22) Filed: Mar. 2, 2000

(30) Foreign Application Priority Data

Mar. 4, 1999 (JP) ............................................ 11-056337

(51) Int. Cl.$^7$ ......................... B29C 33/10; B29D 30/52; B60C 11/00; B60C 11/117; B60C 11/24
(52) U.S. Cl. .............................. 152/154.2; 152/209.15; 156/110.1; 264/326; 425/28.1; 425/812
(58) Field of Search ......................... 152/154.2, 209.15; 425/28.1, 812; 156/110.1; 264/326

(56) References Cited

U.S. PATENT DOCUMENTS

| | | | | |
|---|---|---|---|---|
| 1,380,085 A | * | 5/1921 | Walton .................. | 152/209.15 |
| 1,880,430 A | * | 10/1932 | Furnas .................... | 152/209.15 |
| 5,800,642 A | * | 9/1998 | Ohya ....................... | 156/110.1 |
| 5,980,668 A | * | 11/1999 | Slingluff .................. | 152/154.2 |

FOREIGN PATENT DOCUMENTS

| | | | | |
|---|---|---|---|---|
| EP | 250113 | * | 12/1987 | .............. 152/154.2 |
| GB | 2268715 | * | 1/1994 | .............. 152/154.2 |
| JP | 54-69191 | * | 6/1979 | .................. 425/28.1 |
| JP | 55-110608 | * | 8/1980 | .............. 152/154.2 |
| JP | 7-205614 | * | 8/1995 | ............ 152/209.15 |
| JP | 7-257111 | * | 10/1995 | ............ 152/209.15 |

* cited by examiner

Primary Examiner—Steven D. Maki
(74) Attorney, Agent, or Firm—Rader, Fishman & Grauer, PLLC

(57) ABSTRACT

A pneumatic tire as a slick tire comprising at least one wear indication hole within a contact width of a tread portion, wherein a distance from a shoulder contact end to the wear indication hole is set equal to 35 mm or lower; and a projected line is provided in a surface of the tread portion, the projected line having a height set in a range of 0.1 to 1.0 mm, and being extended from a position in contact with the wear indication hole to a shoulder side. Also, a metallic mold used for building the slick tire.

13 Claims, 3 Drawing Sheets

PNEUMATIC TIRE AND METALLIC MOLD FOR TIRE BUILDING

BACKGROUND OF THE INVENTION

The present invention relates to a slick tire that has no designs other than wear indication holes in a tread portion, and a tire building metallic mold that is used for manufacturing the slick tire. More specifically, the invention relates to a pneumatic tire capable of preventing curing failures by eliminating air accumulation, which tends to occur around a wear indication pin during building by curing, and a metallic mold used for tire building.

To build a pneumatic tire by curing, an uncured tire is inserted into a metallic mold, a diameter of the uncured tire is made to be expanded by an inner pressure to match an inner surface shape of the metallic mold and, in this state, curing is performed. In the curing process, a tread portion is lastly pressed to the inner surface of the metallic mold. For this reason, if there are no air discharging portions between the metallic mold and the uncured tire, air accumulation occurs in the tread portion, which tends to lead to a curing failure.

To deal with the above problem, various methods have been presented, such as a method of discharging air by using a vent hole or a vent groove provided inside the metallic mold, a method for discharging air from a joint of a sectional metallic mold, or the like.

However, in the case of a slick tire that has no designs in its tread portion, e.g., a racing tire, no vent holes or vent grooves like those described above have been applied for the tread portion. This is attributed to the fact that formation of a convexity in a contact patch by transfer of a vent hole or a vent groove results in lost uniformity of a contact pressure, and sufficient tire performance as a racing tire cannot be provided.

On the other hand, in the slick tire, a wear indication hole is provided in the tread portion to know a wear limit. This wear indication hole is formed by a wear indication pin, which is provided to be protruded from a tread forming surface of the metallic mold. Thus, the slick tire has had a problem that air accumulation tends to occur around the wear indication pin during building by curing. Accordingly, the air accumulation around the wear indication pin has frequently caused curing failures.

SUMMARY OF THE INVENTION

An object of the present invention is to provide a pneumatic tire, which is adapted to prevent curing failures by eliminating air accumulation around a wear indication pin during building by curing, and a metallic mold for tire building.

In order to achieve the foregoing object, a pneumatic tire of the invention, which is provided as a slick tire, includes at least one wear indication hole provided within a contact width of a tread portion thereof, wherein a distance from a shoulder contact end to the wear indication hole is set equal to 35 mm or lower, and a projected line is provided in a surface of the tread portion, the projected line having a height set in a range of 0.1 to 1.0 mm, and being extended from a position in contact with the wear indication hole to a shoulder side.

The disposition of the wear indication hole close to the shoulder and the formation of the projected line in the surface of the tread portion, the projected line being extended from the position in contact with the wear indication hole to the shoulder side, enable air to be moved through a vent groove corresponding to the projected line during building by curing and, hence, better rubber flowing can be realized. As a result, since air accumulation around a wear indication pin corresponding to the wear indication hole becomes difficult, curing failures can be prevented.

In order to achieve the foregoing object, a metallic mold for tire building of the invention is adapted to build a slick tire, which includes at least one wear indication pin within a contact width of a tread forming surface, wherein a distance from a shoulder contact end to the wear indication pin is set equal to 35 mm or lower, and a vent groove is provided in the tread forming surface, the vent groove having a depth set in a range of 0.1 to 1.0 mm, and being extended from a position in contact with the wear indication pin to a shoulder side.

The disposition of the wear indication pin close to the shoulder and the formation of the vent groove in the tread forming surface, the vent groove being extended from the position in contact with the wear indication pin to the shoulder side, enable air to be moved through the vent groove during building by curing and, hence, better rubber flowing can be realized. As a result, since air accumulation around the wear indication pin becomes difficult, curing failures can be prevented.

In accordance with the invention, if points of intersection between virtual lines in a tire meridian section are obtained for left and right shoulder portions, one of the virtual lines shaping a contour of a tread portion and being extended to the outside of a tire width direction, and the other virtual line shaping a contour of a side wall portion and being extended to the outside of a tire diameter direction, a distance between these points of intersection represents a tread width, and a contact width occupies 95% of a center of the tread width. A shoulder contact end means an end part of a shoulder side of the contact width.

DETAILED DESCRIPTION OF THE PREFERRED EMBODIMENTS

Figure 1:
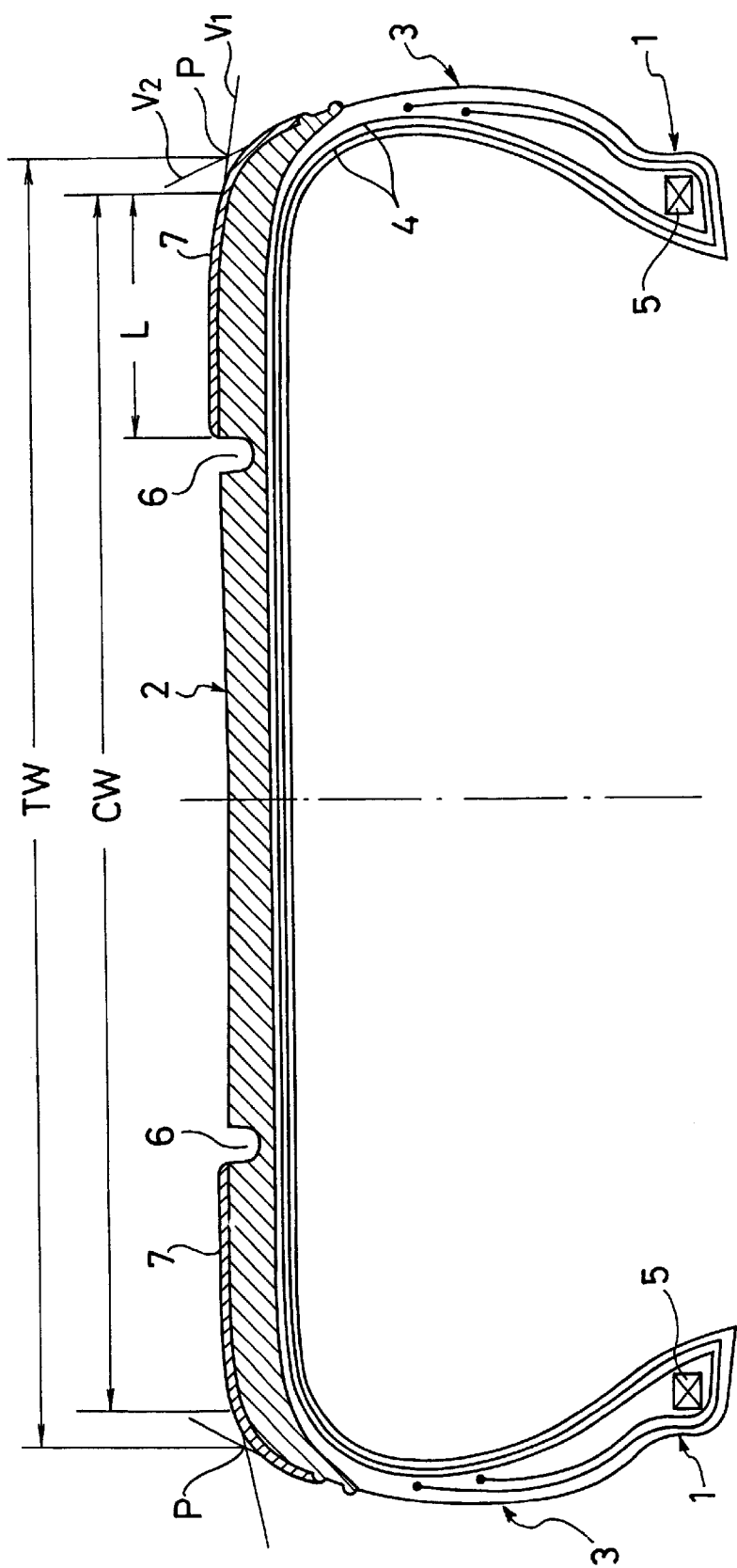
FIG. 1 is a sectional view showing a slick tire according to an embodiment of the present invention.
Figure 2:
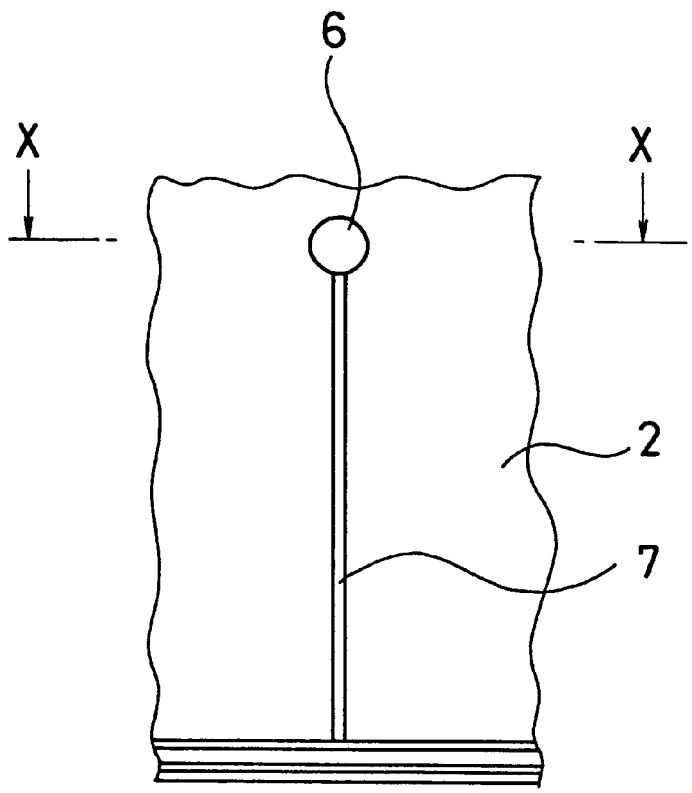
FIG. 2 is an expanded plan view showing main parts of a tread portion of the slick tire shown in FIG. 1.
Figure 3:
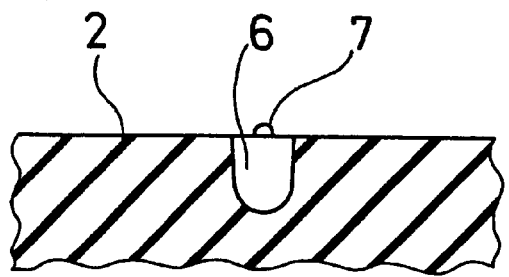
FIG. 3 is a sectional view taken on line X—X of FIG. 2.

FIG. 1 illustrates a racing slick tire according to an embodiment of the present invention. FIGS. 2 and 3 illustrate main portions of the racing slick tire shown in FIG. 1.

In the drawings, a reference numeral 1 denotes a bead portion; 2 a tread portion; and 3 a side wall portion provided to connect the bead portion 1 and the tread portion 2 to each other. Between a pair of left and right bead portions 1 and 1, two carcass layers 4 and 4 formed by arranging a plurality of reinforcing cords in parallel and coating rubber are provided. These carcass layers 4 and 4 are disposed such that the reinforcing cords can incline to a tire circumferential direction, and intersect each other between the layers. Both ends of the carcass layers 4 and 4 in the tire width direction are folded up around respective bead cores 5 from the inside of the tire to the outside thereof.

In the pneumatic tire constructed in the foregoing manner, if it is assumed that a point of intersection is P between virtual lines $V_1$ and $V_2$, the virtual line $V_1$ indicating a circular arc, which shapes a contour of the tread portion 2 and is extended to the outside of a tire width direction, and the virtual line $V_2$ indicating a circular arc, which shapes a contour of the side wall portion 3 and is extended to the outside of the tire diameter direction, a distance between the points of intersection P and P represents a tread width TW. A contact width CW occupies 95% of a center of the tread width TW.

Within the contact width CW of the tread portion 2, at least one wear indication hole 6 is provided. A wear limit can be determined by measuring a depth of the wear indication hole 6 after the start of using the tire. The number of wear indication holes 6 can be optionally set, but preferably it should be 6 or lower. These holes should preferably be dispersed uniformly in the tire circumferential direction. The wear indication hole 6 is circular-shaped when seen from the above, and has a diameter of 2 to 5 mm and a depth of 3 to 6 mm. A distance L from a shoulder contact end to the wear indication hole 6 is set equal to 35 mm or lower. In the tread portion 2, no groove patterns other than the wear indication hole 6 are formed.

In the surface of the tread portion 2, a projected line 7 is provided, which is extended from a position in contact with the wear indication hole 6 toward a shoulder portion. An end part of this projected line 7 is extended at least to the outside of the tread width TW. The projected line 7 has a semi-circular or semi-elliptic sectional shape, and a height set in range of 0.1 to 1.0 mm.

Figure 4:
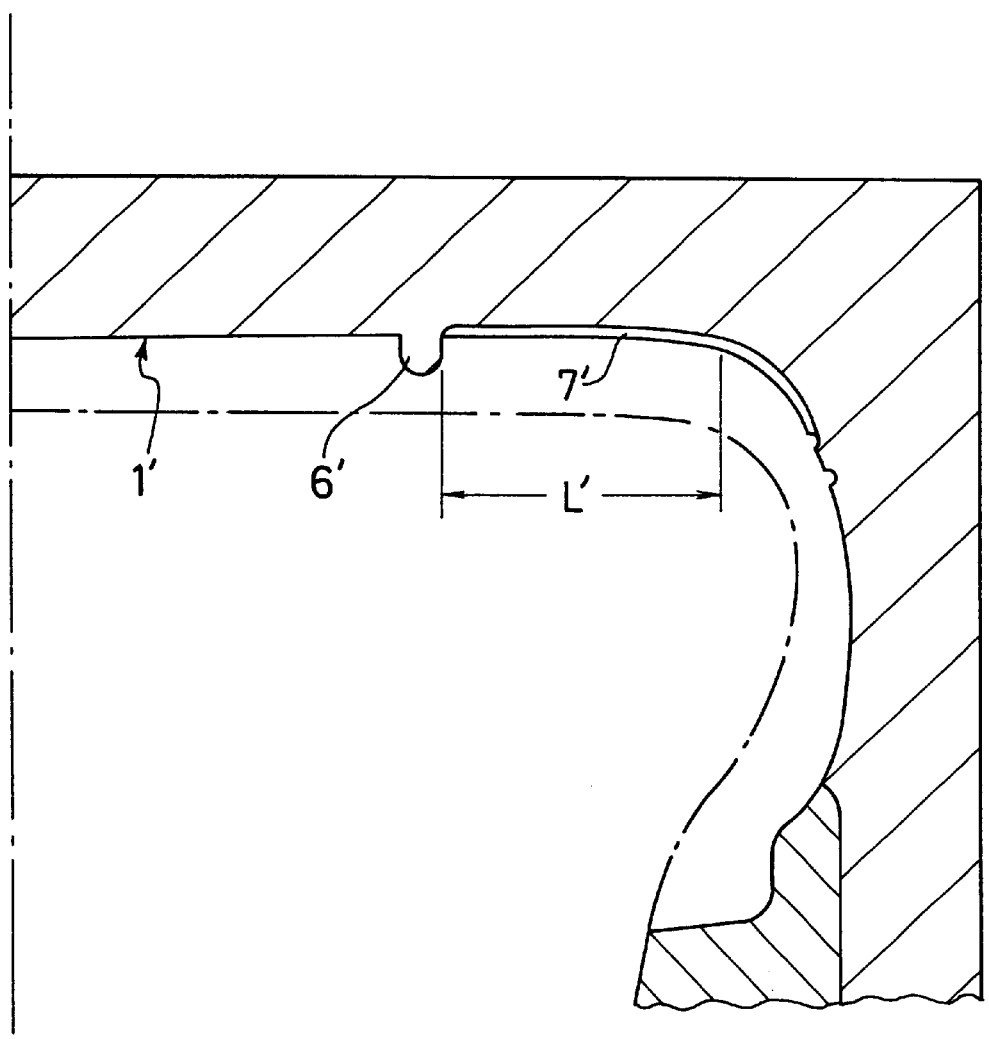
FIG. 4 is a half-sectional view showing a metallic mold for tire building of an embodiment of the invention.

FIG. 4 illustrates a metallic mold for tire building, which is used for building the slick tire by curing. In this metallic mold for tire building, a tread forming surface 1' includes a wear indication pin 6', which is provided to be projected corresponding to the wear indication hole 6. A distance L' from the shoulder contact end to the wear indication pin 6' is set equal to 35 mm or lower. The tread forming surface 1' also includes a vent groove 7', which corresponds to the projected line 7. The vent groove 7' has a semi-circular or semi-elliptic sectional shape, and a depth set in a range of 0.1 to 1.0 mm.

An uncured tire is inserted into the metallic mold for tire building, and then an inner pressure is applied from the inside of the tire by a bladder or the like to press the uncured tire to the inner surface of the metallic mold. In this state, curing is performed. In this way, the slick tire shown in FIG. 1 can be obtained.

With the present invention, because of the wear indication hole 6 disposed close to the shoulder and the projected line 7 provided in a surface of the tread portion 2 and extended from the position in contact with the wear indication hole 6 to the shoulder side, air residence in the vicinity of the wear indication hole 6' can be discharged through the vent groove 7'. Accordingly, rubber flowing can be improved during building by curing. As a result, since air accumulation around the wear indication pin 6' becomes difficult, curing failures can be prevented.

In the foregoing slick tire, if soft racing compound is used as tread rubber, existence of the projected line 7 tends to induce abnormal wear. But by limiting a position of the projected line 7 close to the shoulder side and setting the number thereof on the tire circumference equal to 6 or lower, tire performance will not be damaged. A height of the projected line 7 and a depth of the vent groove 7' should be set in a range of 0.1 to 1.0 mm. If the height or depth is lower than 0.1 mm, an air releasing effect will not be sufficient. Conversely, if the height or depth exceeds 1.0 mm, a contact pressure distribution will be affected to cause extremely abnormal wear. A distance L from the shoulder contact end to the wear indication hole 6 and a distance L' from the shoulder contact end to the wear indication pin 6' should be set equal to 35 mm or lower. If the distance L or L' exceeds 35 mm, a contact pressure distribution will be affected to cause extremely abnormal wear.

It can therefore be understood that the present invention enables curing failures caused by air accumulation to be prevented without any abnormal wear or reductions in tire performance.

EXAMPLE

The inventors manufactured slick tires having a size of 7.1×11.0–5 by means of curing and building in metallic molds. For these tires, only surface structures of tread portions were different as follows.

Embodiment:

Wear indication holes were provided in six places within a contact width of the tread portion. A distance from a shoulder contact end to the wear indication hole was set equal to 35 mm and, in the surface of the tread portion, a projected line was provided to have a height of 1.0 mm, which was extended from a position in contact with the wear indication hole to a shoulder side. In other words, a vent groove was provided in the tread forming surface of the metallic mold, which was extended from a position in contact with a wear indication pin to the shoulder side. The projected line had a semi-circular sectional shape.

Conventional Example

Wear indication holes were provided in six places within a contact width of the tread portion. A distance from a shoulder contact end to the wear indication hole was set equal to 35 mm. In the tread forming surface of the metallic mold, no vent groove that was extended from a position in contact with a wear indication pin to a shoulder side was provided.

For the foregoing tires, the inventors then checked occurrence rates (%) of failures during curing. Results are shown in Table 1. The numbers of tires were 50 for both of the embodiment and the conventional example, respectively.

TABLE 1

|  | Number of tires N | Failure occurrence rate during curing (%) |
| --- | --- | --- |
| Embodiment | 50 | 0 |
| Conventional ex. | 50 | 15 |

From Table 1, it can be understood that the slick tire of the embodiment of the invention had a much smaller occurrence rate of failures during curing compared with that of the conventional example.

What is claimed is:

1. A pneumatic tire, comprising:

a slick tire body having at least one wear indication hole provided within a contact width of a tread portion, wherein a distance from a shoulder contact end of the tread portion to the wear indication hole is set equal to 35 mm, alternatively lower; and a projection is provided in a surface of the tread portion, the projection having a height set in a range of 0.1 to 1.0 mm, and being extended from a position in contact with the wear indication hole to a shoulder side of the slick tire body.

2. A pneumatic tire according to claim 1, wherein said projection is formed to have a semi-circular, alternatively semi-elliptic sectional shape.

3. A pneumatic tire according to claim 1, wherein the slick tire body has a plurality of wear indication holes.

4. A pneumatic tire according to claim 3, wherein the plurality of wear indication holes are disposed circumferentially about the pneumatic tire and equidistantly from one another.

5. A pneumatic tire according to claim 3, wherein a number of wear indication holes is selected from a range of integers between and inclusive of 1 and 6.

6. A pneumatic tire according to claim 5, wherein each one of the wear indication holes is associated with a respective projection.

7. A metallic mold for building a slick tire including:
a metallic mold body having at least one wear indication pin provided within a contact width of a tread forming surface of the mold for building a slick tire,
wherein a distance from a shoulder contact end of the tread forming surface to the wear indication pin is set equal to 35 mm, alternatively lower; and
a vent groove is provided in the tread forming surface, the vent groove having a depth set in a range of 0.1 to 1.0 mm, and being extended from a position in contact with the wear indication pin to a shoulder side of the mold.

8. A metallic mold for building a slick tire according to claim 7, wherein said vent groove is formed to have a semi-circular, alternatively semi-elliptic sectional shape.

9. A metallic mold for building a slick tire according to claim 7, wherein the metallic mold body includes a plurality of wear indication pins.

10. A metallic mold for building a slick tire according to claim 9, wherein the plurality of wear indication pins are disposed circumferentially about the metallic mold body and equidistantly from one another.

11. A metallic mold for building a slick tire according to claim 9, wherein a number of wear indication pins is selected from a range of integers between and inclusive of 1, and 6.

12. A metallic mold for building a slick tire according to claim 11, wherein each one of the wear indication pins is associated with a respective vent groove.

13. A method for manufacturing a slick pneumatic tire, comprising the steps of:
inserting an uncured slick tire into a metallic mold for tire building as claimed in any one of claims 3 and 4; and
performing curing while the uncured slick tire is pressed to an inner surface of the metallic mold wherein the inner surface defines the tread forming surface.

* * * * *